3,072,472
METHOD FOR CONTROLLING THE GROWTH
OF UNDESIRABLE VEGETATION
Melvin J. Josephs, Midland, Mich., assignor to The Dow
Chemical Company, Midland, Mich., a corporation of
Delaware
No Drawing. Filed Sept. 9, 1960, Ser. No. 54,833
5 Claims. (Cl. 71—2.3)

This invention is concerned with the suppression of the growth of undesired vegetation and is particularly directed to compositions and methods for the control of the growth of the germinant seeds, emerging seedlings and established plants of many weed species.

It is an object of the present invention to provide a new and improved method for the suppression and control of the growth of undesired vegetation. Another object is to provide a method for the control of the growth of germinant seeds, emerging seedlings and established plants of many undesired weed species. Another object is the provision of a method for the control of vegetative growth which requires the employment of small amounts of toxicant compound. Another object is the provision of a novel composition adapted to be employed for the accomplishment of the new method of growth control. Other objects will become apparent from the following specification and claims.

According to the present invention, it has been discovered that the growth of plants may be controlled by exposing a part of the growing plant to the action of β-chloro-N,α-dimethyl phenethylamine or a mineral acid salt thereof.

More particularly, it has been discovered that the growth of the germinant seeds, emerging seedlings and established vegetation of many narrow leaved and broad leaved plants may be suppressed by exposing the germinant seeds, emerging seedlings or above-ground portions of established vegetation to the action of said compounds.

β-Chloro-N,α-dimethyl phenethylamine, in the form of its hydrochloride salt, is a white, crystalline solid, corresponding to the formula

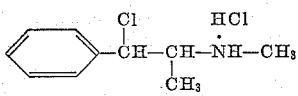

The compound is soluble in many common organic solvents and of very low solubility in water. However, many common mineral acid salts of said compound such as the hydrochloride, sulfate, bisulfate, nitrate, nitrite, phosphate, and the like are readily soluble in water.

The compound or its salt has been found to have a high degree of toxicity to many plants and plant parts and is adapted to accomplish good control of plant growth at very low concentrations of toxicant compound.

The exposure of plants to the action of β-chloro-N,α-dimethyl phenethylamine gives rise to varying degrees of response in germinant seeds, emerging seedlings and growing plants depending upon the form and nature of the plant part contacted, the stage of growth or maturity of the plant and the dosage of the toxicant compound employed. When extremely large dosages are dispersed in soil, a persistent inhibition of the growth of seeds, emerging seedlings and established plants is obtained. The growth medium is possibly freed of the toxicant by the weathering action of the sun, the rain and perhaps the decomposition of the toxicant by the action of microorganisms. Soil applications of more dilute dosages suppress the growth of the seeds of many narrow and broad leaved plant species. The application of the compound to the foliage of many broad and narrow leaved plants suppresses the growth of the treated plants and effects a substantial denuding of the soil.

The exposure of the plant or plant part to the action of a growth-inhibiting amount of β-chloro-N,α-dimethyl phenethylamine or a mineral salt thereof is essential and critical for the practice of the present invention. In foliar treatments for the control of vegetative growth, good results are obtained when 5 or more pounds of the compound are applied per acre. In applications to soil for the control of germinant seeds, emerging seedlings and established vegetation, good results are obtained when the toxicant compound is distributed in the soil at a concentration of from about 2 to 150 parts or more by weight per million parts by weight of soil. In such applications it is desirable that the compound be distributed to a depth of at least one-half inch and preferably at a dosage rate of at least about 1.0 pound per acre inch of soil.

The method of the present invention may be carried out by applying to the growth media or upon the surfaces of the above-ground portions of plants the unmodified β-chloro-N,α-dimethyl phenethylamine compound. However, the present method also embraces the employment of a liquid or dust composition containing said compound. In such usage, the compound may be modified with one or a plurality of additaments or herbicide adjuvants such as water, petroleum distillates or other liquid carriers: surface-active dispersing agents; and finely divided inert solids. Depending upon the concentration of the toxicant, such augmenting compositions are adapted to be distributed in the soil or upon the above-ground surfaces of plants, or employed as concentrates and subsequently diluted with additional inert carrier to produce the ultimate treating compositions.

The exact concentration of the compound to be employed in the treating composition is not critical and may vary considerably provided the required dosage of effective agent is supplied in the growth medium or upon the plant foliage. The concentration of toxicant in organic solvent compositions employed to supply the desired dosage is generally from about 10 to 85 percent by weight. With aqueous compositions, the required dosage is generally supplied with compositions containing 0.2 to 50 percent by weight although concentrations of 0.0002 percent by weight conveniently may be employed in irrigation treatments of soil. In dusts, the concentration of toxicant may be from 1 to 50 percent by weight, although concentrations as low as 0.1 percent by weight are sometimes employed. In compositions to be employed as concentrates the toxicant oftentimes is present in a concentration of from 5 to 95 percent by weight. The quantity of treating composition to be applied may vary considerably provided that the required dosage of active ingredient is applied in sufficient of the finished composition adequately to cover the vegetation to be treated or to facilitate the penetration and distribution of said ingredient in growth media. The required amount of the active ingredient in the soil conveniently may be supplied per acre treated in from 10 to 27,000 U.S. gallons or more of the liquid carrier or in from 50 to 2,000 pounds of the inert solid carrier in the treatment of seeding weeds. Good coverage is obtained when using from 10 to 60 U.S. gallons of finished spray composition per acre. Where large succulent vegetation is concerned, it is frequently desirable to employ up to 250 U.S. gallons or more of the finished spray composition per acre to assure complete coverage of the above-ground portions of the vegetation. In the application of dusts to plant foliage, good results are obtained with from 40 to 200 pounds of finished dust per acre, the only requirement being that the required toxicant dosage be supplied in sufficient dust to achieve good coverage of the foliage.

Liquid compositions containing the desired amount of the β-chloro-N,α-dimethyl phenethylamine compound may be prepared by dispersing the toxicant in an organic liquid or by dispersing the toxicant in water with the aid of a suitable surface-active dispersing agent such as ionic or non-ionic emulsifying agent. Suitable organic liquid carriers include the agricultural spray oils and the petroleum distillates such as diesel fuel, kerosene, fuel oil, naphthas and Stoddard solvent. Among the latter, the petroleum distillates, boiling almost entirely under 400° F. at atmospheric pressure and having a flash point above 80° F., are generally preferred. The aqueous compositions may contain one or more water-immiscible solvents for the β-chloro-N,α-dimethyl phenethylamine compound. Such compositions may be prepared as an aqueous emulsion; that is, a mixture of water-immiscible solvent, emulsifying agent and water. The choice of dispersing and emulsifying agent and the amount thereof employed are dictated by the nature of the composition type and by the ability of the agent to facilitate the dispersion of the compound in the aqueous carrier to produce the desired composition. The surface-active agents are generally employed in the amount of from 1 to 20 percent by weight of the compound. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the compound is dispersed in and on a finely divided inert solid such as talc, chalk, gypsum and the like. In such operations, the carrier is mechanically ground with the compound or with a volatile organic solvent solution thereof. Similarly, dust compositions containing the compound may be prepared from various solid surface-active dispersing agents such as bentonite, fuller's earth, attapulgite and other clays. Depending upon the proportions of ingredients, these dust compositions may be employed as concentrates and subsequently diluted with additional solid surface-active dispersing agents or with talc, chalk, gypsum, and the like to obtain the desired amount of active ingredient in a composition adapted to be applied for the control of the growth of vegetation. Also, such concentrate dust compositions may be dispersed in water with or without the aid of a dispersing agent to form spray mixtures.

When a water-soluble mineral acid salt of the present herbicidal compound is employed it may, if desired, be applied directly to the plants to be suppressed or to the growth medium in which such plants are growing. Such salts may also be dissolved in water with or without the aid of a wetting or dispersing agent and other herbicidal adjuvant substances. Sticking and spreading agents to improve the adhesion of the herbicidal preparation to plant parts may also be used. In some applications the inclusion of small, particulate inert solids, of which the individual particles are sharp, for example sharp sand, may enhance the herbicidal action. The resulting opening of many minute incisions or abraded places in or on the external covering, such as a waxy coating, on the surfaces of plants, sometimes enhances the herbicidal action.

When operating in accordance with the present invention, growth-inhibiting amounts of the compound or a composition containing the toxicant are dispersed in any convenient fashion in soil or other growth media, for example, by simple mixing with the growth media, by applying to the surface of soil and thereafter dragging or disking into the soil to the desired depth, by injection or drilling techniques whereby the toxicant is deposited beneath the surface of the soil or by employing a liquid carrier to accomplish the penetration and impregnation. The application of the spray and dust compositions to the surface of soil or to the aboveground surfaces of plants may be carried out by conventional methods, for example, with power dusters, boom or hand sprayers and the like.

In a further method, the distribution of the toxicant in soil may be accomplished by introducing the toxicant in the water employed to irrigate the soil. In such procedure, the amount of water may be varied in accordance with the porosity and water-holding capacity of the soil in order to obtain the desired depth of distribution of the toxicant.

The following examples illustrate the invention but are not to be construed as a limitation thereof:

*Example 1*

25 parts by weight of β-chloro-N,α-dimethyl phenethylamine, 10 parts of a dimeric alkylated aryl polyether alcohol (Triton X–155) and 65 parts of naphtha are mixed together to prepare a concentrate composition in the form of an emulsifiable liquid.

In a similar manner, 25 parts by weight of β-chloro-N,α-dimethyl phenethylamine, 72 parts of diatomaceous earth, 2 parts of an alkyl aryl sulfonate (Nacconal NR) and 2 parts of a polymerized sodium salt of a substituted benzoic alkyl sulfonic acid (Daxad No. 27) are mechanically mixed and ground together to prepare a concentrate composition in the form of a wettable powder.

Also, a mixture of 20 parts by weight of β-chloro-N,α-dimethyl phenethylamine, 0.1 part of Nacconal NR, 0.1 part of Daxad No. 27 and 200 parts of water are ball-milled together to prepare a water-dispersible concentrate composition.

These concentrate compositions are adapted to be dispersed in water to prepare aqueous compositions having very desirable wetting and penetrating properties.

Also, 30 parts by weight of β-chloro-N,α-dimethyl phenethylamine hydrochloride is dispersed with stirring in 70 parts by weight of water to prepare an aqueous concentrate. A similar preparation contains 30 parts by weight of the β-chloro-N,α-dimethyl phenethylamine hydrochloride, 2 parts by weight of an alkali metal alkyl aryl sulfonate surfactant compound as wetting agent, and 68 parts by weight of water.

These aqueous solutions are diluted with further water to prepare herbicidal compositions adapted to be employed in conventional agricultural spray equipment. Also, cosolvents and solvents for the waxy coatings of plant leaves may be combined therewith; for example petroleum oils, acetone, xylene, toluene, benzene, and the like.

The aqueous compositions are adapted also to be employed to distribute growth inhibiting dosages of the compound in soil or upon the above-ground surfaces of plants.

*Example 2*

An aqueous composition was prepared by dissolving four parts by weight β-chloro-N,α-dimethyl phenethylamine hydrochloride in 100 parts by weight acetone and dispersing the resulting acetone solution in water with the aid of 0.2 part sorbitan trioleate and 0.05 part polyoxyethylene sorbitan monooleate as surface active agents to prepare 1000 parts of an aqueous dispersion of the said hydrochloride. The aqueous dispersion was further diluted to a concentration of 0.20 pound of toxicant per hundred gallons of water and the resulting dispersion applied at the rate of 20 pounds of said hydrochloride per acre to the undisturbed top surface of a fertile sandy loam soil which had been prepared and planted with seeds of German millet, pigweeds, foxtail, wild oats and other weed species.

The soil was thereafter observed for evidence of growth or suppression of growth of the seeds. Check plantings were similarly treated except that the composition employed did not contain the β-chloro-N,α-dimethyl phenethylamine hydrochloride. By the end of two weeks, no growth of the seeds treated in the manner of the present invention had taken place; in contrast, the check areas had a heavy population of plants of the seedling species.

Example 3

Healthy, young, fast-growing plants of pigweed (Amaranthus spp.), German millet, Sudan grass, and Japanese millet, growing under favorable conditions in fertile sandy loam soil, were treated with a composition of the present invention. The plants were sprayed with an aqueous dispersion containing approximately 8.5 pounds of β-chloro-N,α-dimethyl phenethylamine hydrochloride toxicant per hundred gallons of composition. The spray was applied in such amount that all the exposed plant surfaces were wet, and further-applied spray fell or ran freely from these surfaces. Application in such amount is commonly known in the practice of agricultural pesticide use, as application to "run-off." A like group of plants was similarly treated with a composition identical except that the β-chloro-N,α-dimethyl phenethylamine hydrochloride was omitted therefrom.

The plants were thereafter maintained under favorable growing conditions and observed daily for evidence of the effect of application of said sprays. The check plants to which the toxicant of the present invention was not applied grew normally and remained in good condition. The plants treated according to the present invention became distinctly chlorotic and assumed an increasingly bleached appearance. Very little, if any growth, subsequent to spraying occurred in these plants. At the end of fourteen days following the application of the toxicant spray, all of the said plants were dead. Etiological aspects of the kill of the plants were not fully elaborated; distinct dechlorophyllation of the said plants took place and is believed to have been a major mechanism in the killing of the plants.

Employing known procedural steps, essentially similar to those hereinbefore described, the present toxicant has been found to give good control, that is to say, good kill and suppression to the growth of seeds, emerging seedlings, and growing plants of crab grass, marigold, corn, cucumber, wild oats, pinto beans, radish, meadow fescue, peas and tomatoes. Similar results are obtained when the toxicant is employed as the sulfuric acid salt, the bisulfate, the nitrite, the nitrate, the phosphate or the hydrobromide of β-chloro-N,α-dimethyl phenethylamine. Thus, both the present herbicidal β-chloro-N,α-dimethyl phenethylamine and its various mineral acid salts are highly effective herbicides against plants of many species and families in which weed species occur.

The present herbicidal toxicant is, as a compound, known in the arts of organic chemistry. The compound, together with a method for its preparation, is fully set forth in Archiv der Pharmazie (Verlag Chemie G.m.b.H.), Weinheim, Bergstrasse, 1955, volume 288, in the work of Pfanz and Wieduwilt, pages 563–582. Briefly, the authors took pseudephedrine hydrochloride (which may also be identified as threo-1-phenyl-1-hydroxy-2-methylaminopropane) and treated it with excess cold $SOCl_2$, in vacuum. They stirred the resulting residue with chilled acetone, filtered, and recrystallized the resulting product residue from propanol. The compound melts at 185° C.

The expression "growth media" and "soil" are employed in the present specification and claims in their broadest sense to be inclusive of all conventional "soils" as defined in "Webster's New International Dictionary," second edition, unabridged, published in 1937 by G. and C. Merriam Company, Springfield, Massachusetts. Thus, the term refers to any substances or media in which vegetation may take root and grow and is intended to include not only earth but also compost, manure, muck, humus, sand and the like adapted to support plant growth. The term "plant part" as employed in the present specification and claims is intended to be inclusive of the stems, branches, roots, foliage, and germinant seeds of plants.

I claim:
1. A method for the suppression of the germinant seeds and emerging seedlings of undesirable narrow leaved and broad leaved weeds in soil which comprises distributing a compound selected from β-chloro-N,α-dimethylphenethylamine and the mineral acid salts thereof in such soil in the amount of from 2 to 150 parts by weight per million parts by weight of soil.

2. A method for the suppression of the growth of plants which comprises contacting growing plants and plant parts with a growth-inhibiting amount of an aqueous dispersion of a compound selected from β-chloro-N,α-dimethylphenethylamine and the mineral acid salts thereof in intimate admixture with an emulsifying and dispersing agent, said aqueous dispersion containing at least 0.0002 percent by weight of said component.

3. A method for the suppression of the growth of plants which comprises contacting growing plants and plant parts with a growth-inhibiting amount of β-chloro-N,α-dimethylphenethylamine and the mineral acid salts thereof.

4. A method for the suppression of the growth of plants which comprises impregnating soil with a growth-inhibiting amount of a compound selected from β-chloro-N,α-dimethylphenethylamine and the mineral acid salts thereof.

5. A method for the suppression of the growth of plants which comprises impregnating soil with a growth-inhibiting amount of a composition comprising a compound selected from β - chloro - N,α - dimethylphenethylamine and the mineral acid salts thereof as an active ingredient in intimate admixture with an inert herbicide adjuvant as a carrier therefor.

References Cited in the file of this patent

UNITED STATES PATENTS 2,884,455     Robertson et al.     Apr. 28, 1959

OTHER REFERENCES

Jones et al. in "Biochemical Journal," vol. 45, 1949, pages 143–9.